Aug. 31, 1965  C. C. POYNTER  3,203,632
PORTABLE ROCK CRUSHING PLANT
Filed Feb. 8, 1963  3 Sheets-Sheet 1

INVENTOR.
Corbin C. Poynter
BY
ATTORNEYS

Aug. 31, 1965 C. C. POYNTER 3,203,632
PORTABLE ROCK CRUSHING PLANT
Filed Feb. 8, 1963 3 Sheets-Sheet 2

INVENTOR.
Corbin C. Poynter
BY
ATTORNEYS

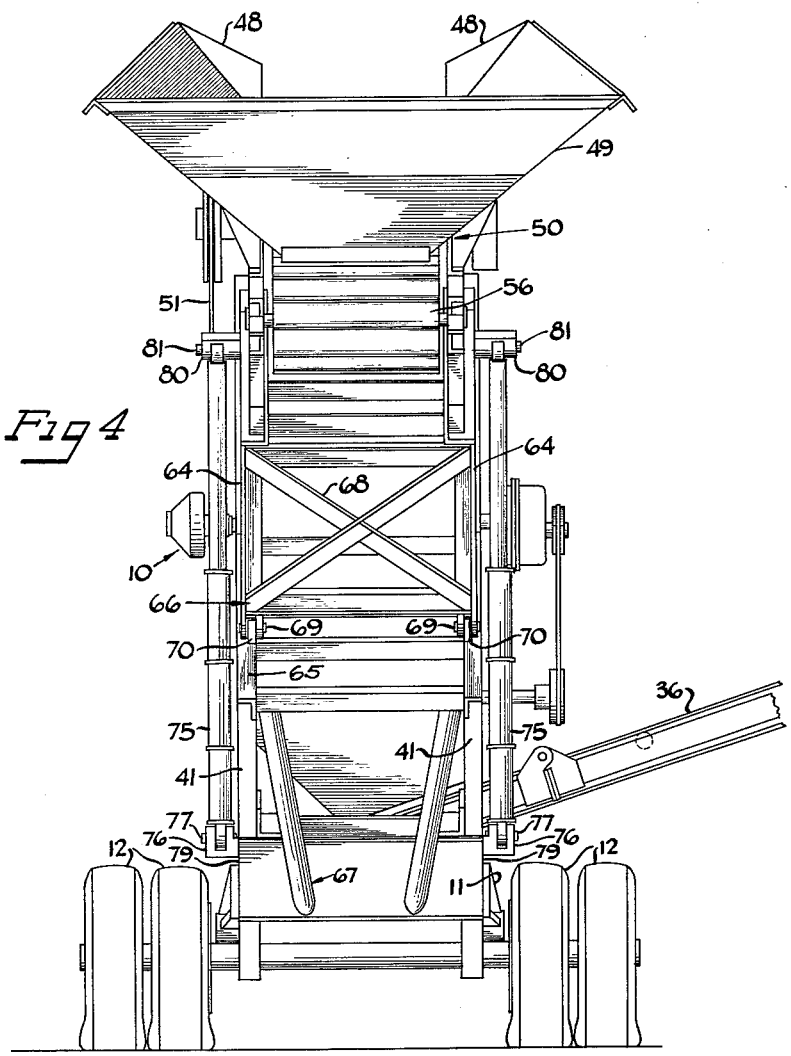
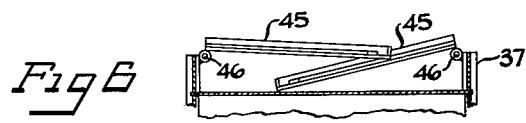

United States Patent Office 3,203,632
Patented Aug. 31, 1965

3,203,632
PORTABLE ROCK CRUSHING PLANT
Corbin C. Poynter, Downers Grove, Ill., assignor to Goodman Manufacturing Company, Chicago, Ill., a corporation of Illinois
Filed Feb. 8, 1963, Ser. No. 257,220
5 Claims. (Cl. 241—81)

This invention relates to improvements in rock crushing plants and more particularly relates to an improved form of portable primary rock crushing plant.

In portable rock crushing plants, the crusher is mounted on a wheeled frame structure and is supplied with aggregate by an inclined vibrating screen or grizzly inclined downwardly towards the crusher, which in turn is supplied with rock by an apron feeder, inclined upwardly from its receiving to its discharge end and discharging into the elevated receiving end of the grizzly. The high point of the crushing plant is, therefore, the apron feeder at the receiving end of the plant and the height of the apron feeder is dictated by the crusher, supplied with rock by the apron feeder and grizzly.

Such plants are towed from place to place by a tractor and the like and where the plant must pass under bridges or overpasses, the apron feeder must be removed from the plant and then be reassembled when the crusher reaches its destination. The removing and assembling of the apron feeder is a long and laborious project, each operation requiring a day's time, unduly tying up the plant and adding to the cost of the crushing operation.

By the structure of the present invention I have provided a stationary platform for supporting the apron feeder well below its operating position when the plant is traveling from place to place, together with a movable platform carrying the feeder and elevated by power to bring the feeder up to its operative position and thereby materially saving in the time and labor heretofore required to prepare the plant for transportation and for use when transported to its new working place.

A principal object of the invention, therefore, is to provide a novel and improved form of portable crusher for rock and the like, arranged with a view toward reducing the height of the crusher plant for transportation without dismantling the plant.

Another object of the invention is to provide a novel and improved form of portable crusher plant having a crusher and a grizzly and feeder for supplying the crusher with rock, in which the feeder is supported on a vertically movable platform and positioned thereby at a sufficient elevation above the crusher and grizzly to supply rock thereto during operation of the plant, and movable onto a lowermost support during transportation of the plant.

A further object of the invention is to provide a vertically movable support for the feeder of a portable rock crusher, in the form of a parallel linkage arrangement, and a hydraulic ram for elevating the feeder into an elevated operative position into material discharge relation with respect to the grizzly, feeding screened rock to the crusher.

Still another object of the invention is to provide an improved form of rock crushing plant in which a crusher is mounted on a wheeled frame and supplies crushed rock for further processing, and is supplied with screened rock by a grizzly into which rock is fed by an elevated feeder conveyor, in which the feeder conveyor is supported on a vertically movable platform moved into an elevated position by a parallel linkage and hydraulic ram means, in which the point of connection of the ram to the movable platform is overcenter with respect to the parallel links, when the feeder is in an elevated position, and in which the hydraulic ram lowers the platform and feeder onto a lowermost support platform therefor, for tramming from working place to working place.

These and other objects of the invention will appear from time to time as the following specification proceeds and with reference to the accompanying drawings wherein:

FIGURE 4 is a view looking at the rear end portion of the machine along line 4—4 of FIGURE 2;

FIGURE 5 is an enlarged fragmentary plan view looking substantially along line 5—5 of FIGURE 1 and showing the spill plates for the grizzly or vibrating feeder in a downwardly folded position; and FIGURE 6 is a fragmentary sectional view taken substantially along line 6—6 of FIGURE 1.

Figure 1:
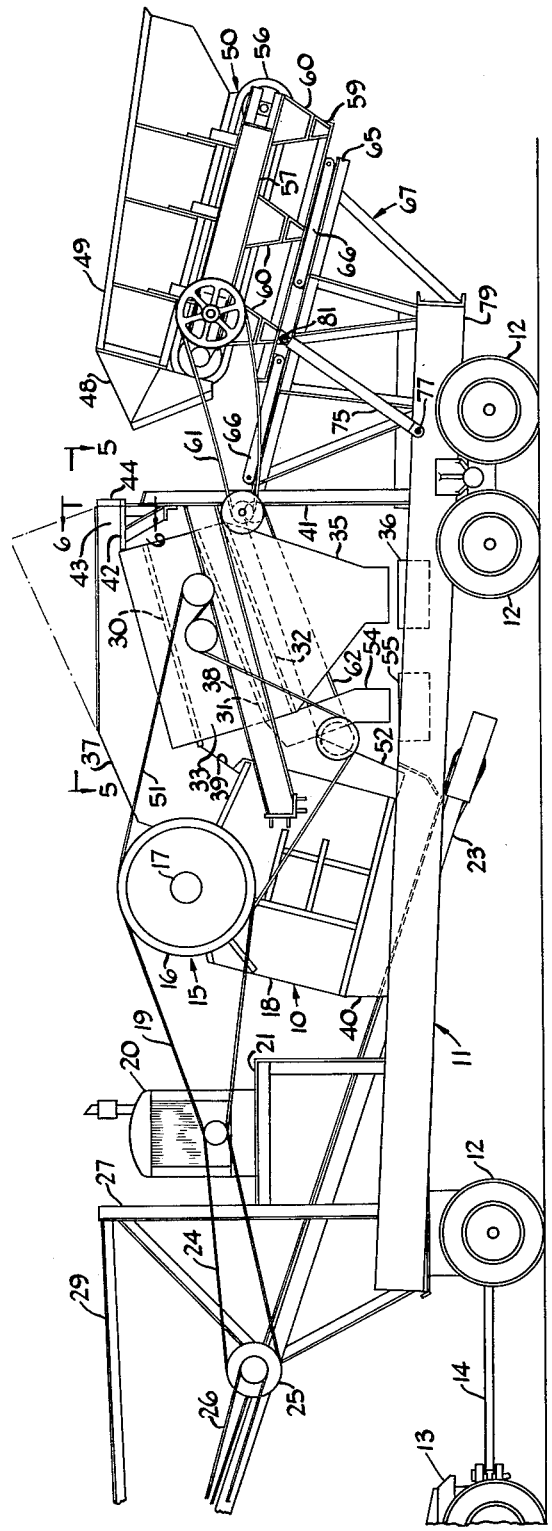
FIGURE 1 is a view in side elevation of a primary rock crushing plant constructed in accordance with the principles of the present invention with the feeder conveyor supported in a lowermost position for tramming.

In the embodiment of the invention illustrated in the drawings, I have shown in FIGURE 1 a portable primary rock crushing plant 10, including the main frame structure 11 mounted on wheels and axles 12, 12. The wheel mounted frame 11 may be connected with a tractor 13 through a trailer hitch 14, when it is desired to transport the crushing plant from working place to working place (FIGURE 1).

The crushing plant includes a rock crusher 15, at the center of the frame structure 11 and extending upwardly therefrom. The rock crusher 15 may be a jaw type of crusher of a conventional construction, the crusher herein shown being illustrated in Bulletin No. 600 of Diamond Iron Works Division, Goodman Manufacturing Company, Halsted Street and 48th Place, Chicago 9, Illinois. The crusher 15 includes spaced fly wheels 16 mounted on a transverse shaft 17 at the top of a housing structure 18 for the crusher jaws (not shown). One fly wheel 16 is provided with grooves in the periphery thereof to receive multiple V-belts 19, for driving the fly wheel 16 and crusher jaws (not shown) from a motor 20. The motor 20 is shown as being an internal combustion engine and is mounted on a platform 21 spaced above the main frame structure 11 and suitably mounted thereon. The motor 20 also serves as a drive means for an inclined elevating conveyor 23, extending in advance of the main frame structure 11 in an upwardly inclined direction for discharging onto a secondary crusher, or into a bin or other suitable material carrying devices. The inclined elevating conveyor 23 may be a well known form of troughed belt conveyor, and the drive thereto may include a V-belt drive 24 and a V-belt drive 26 driven from a pulley 25 driven from the V-belt drive 24. The V-belt drive 26 drives a head pulley (not shown), for the inclined elevating conveyor 23 and at the discharge end of said conveyor. The overhanging discharge end of the inclined elevating conveyor 23 is supported on a cantilever frame structure including parallel spaced uprights 27 and beams 29 extending forwardly therefrom and connected to the forward end of the conveyor adjacent the head pulley thereof.

The rock crushing plant also includes a grizzly in the form of a vibrating screen 30 and vibrating screens 31 and 32 of a progressively smaller mesh, disposed beneath the vibrating screen 30. The vibrating screens 30, 31 and 32 are suitably supported between parallel spaced side plates 33, 33, terminating at their lower end portions beneath the lowermost vibrating screen 32 into a discharge duct 35 discharging the fines into a discharge conveyor 36 extending transversely of the frame structure 11. The side plates 33 terminate at their upper ends into a hopper 37 extending upwardly therefrom and confining the material discharged onto the vibrating screen 30 and passing along said screen to pass into the crusher 15 through an intake duct 39. Material passing through the crusher 15 is discharged into a hopper 40 extending along opposite sides of the inclined elevating conveyor 23 and discharging the crushed material onto said conveyor.

Figure 2:
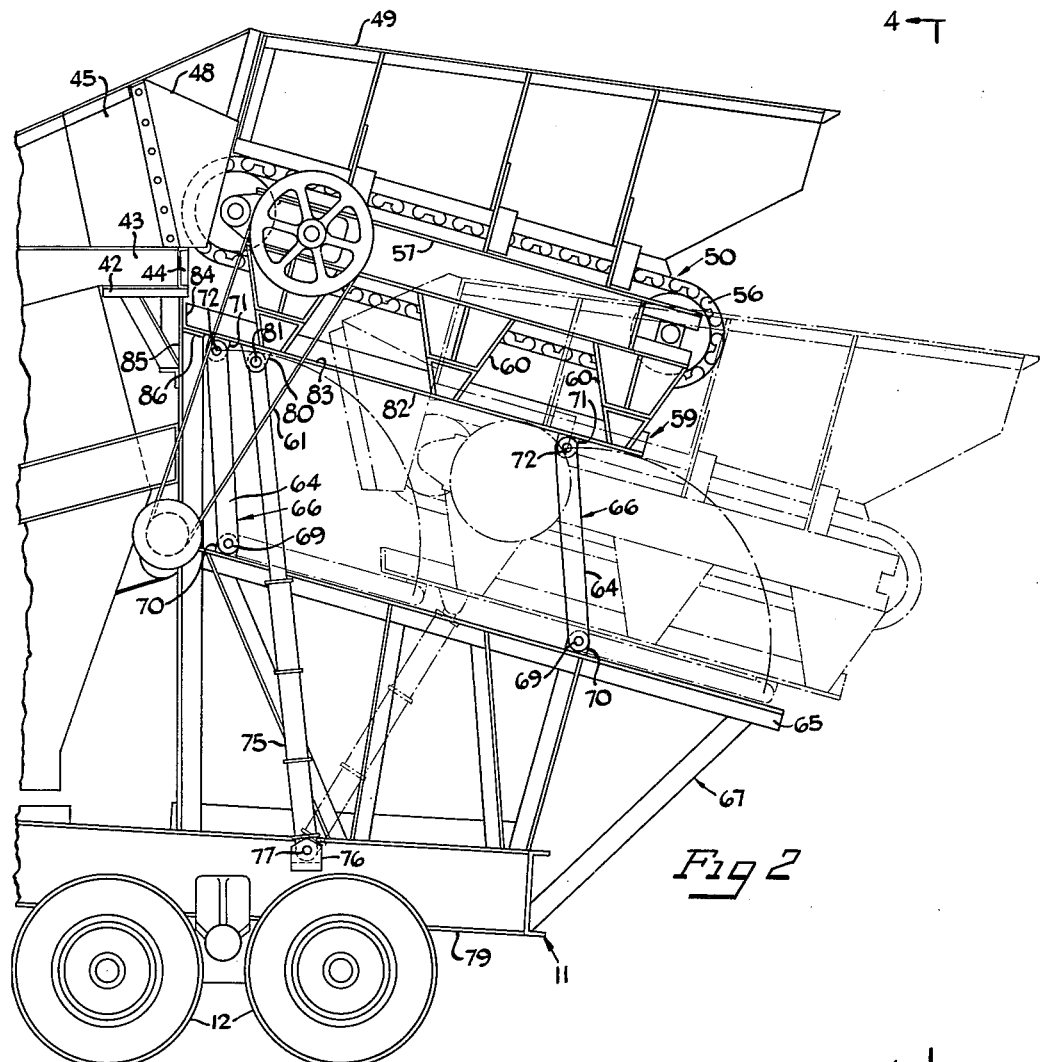
FIGURE 2 is an enlarged fragmentary view in side elevation of the rear or receiving end portion of the plant, showing the feeder in an elevated position by solid lines and in a transportation position by broken lines.
Figure 3:
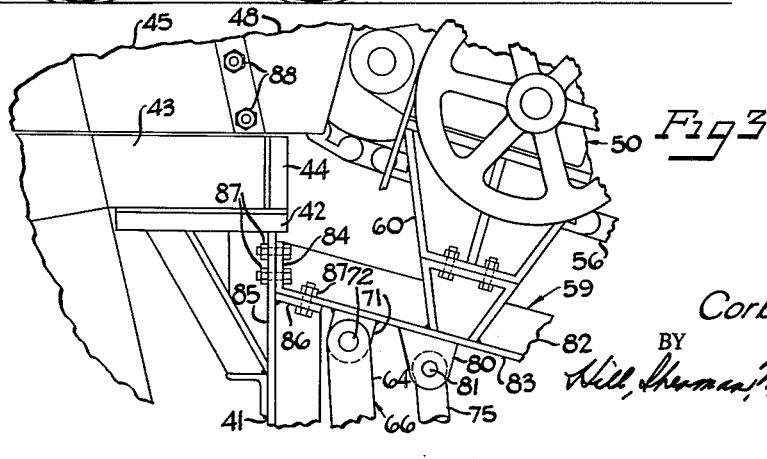
FIGURE 3 is an enlarged partial fragmentary detail view in side elevation, showing the connection of the feeder to the supporting frame structure for the vibrating screen or grizzly.

The vibrating screens 30, 31 and 32, side plates 33 and the hopper 37 are supported between spaced channels 38 extending from the crusher housing 18 to parallel spaced upright frame structures 41 extending upwardly from the main frame 11. The frame structures 41 have a shelf 42 supported at the upper end thereof and extending forwardly therefrom. The shelf 42 is shown in FIGURES 1, 2 and 3 as forming a support for parallel spaced arms 43, extending rearwardly of the hopper 37 and forming a part thereof. The space between said arms is closed by a back plate 44.

Spill plates 45, 45 extending along opposite sides of the hopper 37 and pivotally mounted thereon on hinge pins 46, 46, are foldable over the top of the hopper when it is desired to transport the crusher plant from place to place (FIGURES 5 and 6). When the spill plates 45, 45 are in their upwardly extended positions shown in FIGURE 2, extension plates 48 of a bin 49 of an apron feeder 50 are bolted thereto to close the gap between said feeder and spill plates.

The vibrating screens 30, 31 and 32 may be driven from the flywheel 16 through a conventional form of V-belt drive 51. The mechanism for vibrating said screens may be a weighted eccentric drive mechanism of a conventional form, and is no part of the present invention so need not herein be shown or described further.

Material passing through the screen 30 but failing to pass through the screen 31 is discharged onto a chute 52 opening into the hopper 40 for discharge onto the conveyor 23. Material passing through the screen 31 but failing to pass through the screen 32 is discharged into a chute 54 discharging onto a transverse conveyor 55.

The apron feeder 50 is a well known form of apron feeder in which a conventional apron conveyor 56 extends along the bottom of the bin 49 in an upwardly inclined direction and feeds rock discharged into the bin 49 onto the grizzly or vibrating screen 30, for crushing and screening. The feeder 50 is carried by parallel spaced channels 57 supported in vertically spaced relation with respect to a movable platform 59 on pedestals 60, 60. The pedestals 60, 60 are shown as being of an inverted triangular form in side elevation, and are mounted on the movable platform 59 at their lower ends and have direct supporting engagement with the flanges of the channels 57 at their upper ends. A chain and sprocket drive 61 driven from a chain and sprocket drive 62, which in turn is driven from the V-belt drive 51, is provided to drive the apron conveyor 56.

The movable platform 59 is movably mounted on a stationary platform 65 on parallel links 66 and is directly supported thereon, when the apron feeder 50 is in its traveling position, as shown in solid lines in FIGURE 1 and in broken lines in FIGURE 2. The stationary platform 65 extends rearwardly of the uprights 41 in a downwardly inclined direction, parallel to the plane of the movable platform 59 when the apron feeder 50 is in its feeding position shown in FIGURE 2. An upright support frame structure generally indicated by reference character 67 is provided to support the stationary platform 65 on the rear end portion of the main frame 11, to overhang the rear end thereof.

The parallel links 66 are shown in FIGURE 4 as being in the form of an open framework having side links 64 at each side of the platform 65 and braced together by a cross frame structure 68.

As shown in FIGURES 2 and 4, the parallel links 66 are pivotally supported on the stationary platform 65 on pivot pins 69 mounted on ears 70 extending upwardly of the stationary platform 65, at opposite sides thereof. The upper ends of the parallel links 66 are mounted on depending ears 71 depending from the bottom of the movable platform 59, on pivot pins 72.

The means for lowering the movable platform 59 to be supported on the stationary platform 65 is shown as being multi-stage hydraulic rams 75, pivotally connected at their lower ends to connector brackets 76 on pivot pins 77. The connector brackets 76 are shown as being mounted on the outsides of parallel channels 79, forming side frame members for the main frame 11. The upper ends of the hydraulic rams 75 extend between spaced connector ears 80, depending from the bottom of the movable platform 59 and pivotally connected thereto, as by pivot pins 81. It may be seen from FIGURE 2 that the pivot pins 72 of the parallel links 66 are overcenter with respect to the pivot pins 69, when the apron feeder is in the position shown. The apron feeder 50 and bin 49 of themselves will thus move into discharge relation with respect to the hopper 37 as the links 66 move past center and may be maintained in this position during operation of the feeder 50, where the feeder is operated for short intervals of time. When, however, the rock crusher is in a semi-permanent location for operation over relatively long periods of time, the movable platform 59 may be bolted to the upright supports 85, as shown in FIGURE 3.

The platform 59 is shown in FIGURE 3 as being formed from spaced angles 82 suitably braced together and having horizontal legs 83 bent upwardly at their rear ends to form vertical abutment 84 abutting vertical legs 85 of the upright supports 41 when the apron feeder 50 is in position to discharge material onto the grizzly 30. The bottom wall 83 also abuts a plate 86 extending rearwardly of the leg 85 in a plane parallel to the plane of the horizontal leg 83, when the movable platform is in its extreme upper position. The horizontal legs 83 may be bolted to the plates 86 and the vertical abutments 84 may be bolted to the legs 85 as by nuts and bolts 87. When the movable platform 59 is in this upright position, the extension plates 48 may also be bolted to the spill plates 45 to retain said spill plates in the upright position shown in FIGURE 2, as by nuts and bolts 88.

The platform 59 and apron feeder 50 may thus be retained in their upright positions by the overcenter positions of the pivot pins 72 with respect to the pivot pins 69. In order to avoid inadvertent lowering of the apron feeder 50, as when pressure may be removed from the hydraulic rams 75 and the frame 11 may be subject to jarring, the movable platform 59 may be retained in its upright position by the nuts and bolts 87, 87 bolting the platform to the uprights 41 as well as the nuts and bolts 88 bolting the extension plates to the spill plates 45. Due, however, to the overcenter positions of the links 66, the tension and shear of the nuts and bolts 87, 87 is reduced to a minimum, and said nuts and bolts are only placed under tension and shear upon the tendency of the platform 59 and apron feeder 50 to be moved downwardly toward the platform 65.

It may also be seen that by the simple expedient of removing the nuts and bolts 87 and 88, the apron feeder 50 may be lowered to a position with the top of the bin 49 on the level with the top of the hopper 37 with the spill plates 45 folded inwardly and that the crushing plant may then be readily transported from place to place under viaducts or places of low head room.

While I have herein shown and described one form in which my invention may be embodied, it may readily be understood that various variations and modifications in the invention may be attained without departing from the spirit and scope of the novel concepts thereof as defined by the claims appended hereto.

I claim as my invention:

1. In a portable crushing plant for aggregate and the like, a mobile frame, a crusher mounted on said frame intermediate the ends thereof, an inclined elevating conveyor in material receiving relation with respect to said crusher and extending along said frame in an upwardly inclined plane beyond the forward end thereof, a grizzly in material discharge relation with respect to said crusher, an apron feeder spaced above said grizzly, a movable platform at the rear of said main frame forming a support for said apron feeder, a second platform spaced beneath said first platform and forming a support for said movable platform, supporting said platform beneath the top of said grizzly upon tramming of the plant from location to location, a fixed abutment engaged by said movable platform when said feeder is in position to discharge rock onto said grizzly, movable support means for said movable platform, including parallel links transversely pivoted at their lower ends to said second platform and at their opposite ends to said movable platform, and an extensible power member connected between said main frame and said first platform for vertically moving said first platform and said apron feeder about said parallel links into direct engagement with said fixed abutment, said parallel links being overcenter with respect to their axes of connection to said first platform, whereby the weight of said apron feeder and platform will hold said platform into engagement with said fixed abutment.

2. In a portable crushing plant for aggregate and the like, a mobile frame, a crusher mounted on said frame intermediate the ends thereof, an inclined elevating conveyor in material receiving relation with respect to said crusher and extending along said frame in an upwardly inclined plane beyond the forward end thereof, a grizzly in material discharge relation with respect to said crusher, an apron feeder spaced above said grizzly, a movable platform at the rear of said main frame forming a support for said apron feeder, a second platform spaced beneath said first platform and forming a support for said movable platform, supporting said platform beneath the top of said grizzly upon tramming of the plant from location to location, a fixed abutment engaged by said movable platform when said feeder is in position to discharge rock onto said grizzly, movable support means for said movable platform, including parallel links transversely pivoted at their lower ends to said second platform and at their opposite ends to said movable platform, and an extensible power member connected between said main frame and said first platform for vertically moving said first platform and said apron feeder about said parallel links into direct engagement with said fixed abutment, said parallel links being overcenter with respect to their axes of connection to said first platform, whereby the weight of said apron feeder and platform will hold said platform into engagement with said fixed abutment, and means detachably bolting said first platform to said fixed abutment.

3. In a portable crushing plant for aggregate and the like, a mobile frame, a crusher mounted on said frame intermediate the ends thereof and extending upwardly therefrom, an inclined elevating conveyor in material receiving relation with respect to said crusher and extending beyond the forward end of said frame in an upwardly inclined plane, an apron feeder on the opposite side of said crusher from said elevating conveyor, inclined upwardly from its receiving to its discharge end, a grizzly in material discharge relation with respect to said crusher, a fixed abutment registering said apron feeder in material discharge relation with respect to said grizzly, a hopper extending upwardly of said grizzly and having spaced side walls having spill plates longitudinally pivoted thereto and extending along the upper end portion thereof, a vertically movable support for said apron feeder supporting said feeder into engagement with said fixed abutment in material discharge relation with respect to said grizzly and moving said feeder downwardly beneath said side plates of said hopper, said apron feeder including a bin extending therealong and extension plates extending forwardly of said bin into registry with said spill plates when in upwardly extended relation with respect to said hopper, and means bolting said extension plates to said spill plates to retain said spill plates in position, and releasing said extension plates from said spill plates to accommodate said spill plates to fold downwardly over the top of said grizzly.

4. In a portable crushing plant for aggregate and the like, a mobile frame, a crusher mounted on said frame intermediate the ends thereof and extending upwardly therefrom, an inclined elevating conveyor in material receiving relation with respect to said crusher and extending beyond the forward end of said frame in an upwardly inclined plane, an apron feeder on the opposite side of said crusher from said elevating conveyor, inclined upwardly from its receiving to its discharge end, a grizzly in material discharge relation with respect to said crusher, a fixed abutment registering said apron feeder in material discharge relation with respect to said grizzly, a hopper extending upwardly of said grizzly and having spaced side walls having spill plates longitudinally pivoted thereto and extending along the upper end portion thereof, a vertically movable support for said apron feeder supporting said feeder into engagement with said fixed abutment in material discharge relation with respect to said grizzly and moving said feeder downwardly beneath said side plates of said hopper, said apron feeder including a bin extending therealong and extension plates extending forwardly of said bin into registry with said spill plates when in upwardly extended relation with respect to said hopper, means bolting said extension plates to said spill plate to retain said spill plates in position, and releasing said extension plates from said spill plates to accommodate said spill plates to fold downwardly over the top of said grizzly, parallel links pivotally connected between said main frame and said support means, and an extensible power member connected between said main frame and said support means and elevating said apron feeder about the axes of said parallel links into material discharge relation with respect to said grizzly and lowering said apron feeder into a lowermost transporting position with the top thereof no higher than the tops of said side walls of said hopper.

5. In a portable crushing plant for aggregate and the like, a mobile frame, an apron feeder movably mounted on said frame, a crusher supported on said frame beneath said feeder, and a vibrator screen mounted on said frame beneath said feeder and crusher, the improvements comprising a vertically swingable support for said apron feeder on said frame comprising a plurality of parallel links transversely pivoted to said frame and a platform pivotally supported on said parallel links, an abutment for said feeder and platform engaged by said platform when said feeder is in material discharge relation with respect to said crusher and retaining said parallel links in overcenter positions with respect to their points of connection with said frame and feeder when said platform is in engagement with said abutment, and extensible power means pivotally connected between said frame and platform for vertically moving said platform and feeder away from said abutment into a lowermost position for transportation of the crushing plant and vertically swinging said support into an upper position into engagement with said abutment and moving overcenter with respect to its points of connection between said frame and platform when said platform is in engagement with said abutment to hold said feeder in engagement with said abutment in position to feed rock and the like onto said crusher by the overcenter position of said extensible power means with respect to said frame and platform.

References Cited by the Examiner
UNITED STATES PATENTS

| | | | |
|---|---|---|---|
| 1,611,128 | 12/26 | Gunnison | 241—81 X |
| 2,674,386 | 4/54 | Larson | 214—148 |
| 2,925,079 | 2/60 | Saxe | 241—101 X |

J. SPENCER OVERHOLSER, *Primary Examiner.*